United States Patent
Komatsu et al.

(10) Patent No.: US 10,859,836 B2
(45) Date of Patent: Dec. 8, 2020

(54) HEAD-MOUNTED DISPLAY

(71) Applicant: SEIKO EPSON CORPORATION, Tokyo (JP)

(72) Inventors: Akira Komatsu, Tatsunomachi (JP); Masayuki Takagi, Azumino (JP); Toshiaki Miyao, Matsumoto (JP); Takashi Takeda, Suwa (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/506,326

(22) Filed: Jul. 9, 2019

(65) Prior Publication Data

US 2020/0018967 A1 Jan. 16, 2020

(30) Foreign Application Priority Data

Jul. 10, 2018 (JP) .................................. 2018-130462

(51) Int. Cl.
  *G02B 27/01* (2006.01)
  *G02B 5/08* (2006.01)
  *G02B 5/30* (2006.01)

(52) U.S. Cl.
  CPC ........... *G02B 27/0172* (2013.01); *G02B 5/08* (2013.01); *G02B 5/30* (2013.01); *G02B 2027/0136* (2013.01)

(58) Field of Classification Search
  CPC ........ G02B 23/00; G02B 27/01; G02B 27/10; G02B 27/12; G02B 27/14; G02B 27/22; G02B 5/04; G02B 5/08; G02B 5/18; G02B 5/30; G02B 5/32; G02B 21/00; G02B 17/08; G02B 13/08; G03H 1/00; G03H 1/02; G09G 5/00; G09G 3/02
  See application file for complete search history.

(56) References Cited

U.S. PATENT DOCUMENTS 6,023,373 A  2/2000 Inoguchi et al.
2002/0163734 A1* 11/2002 Inoguchi ............ G02B 27/1066
                                            359/631

(Continued)

FOREIGN PATENT DOCUMENTS

JP   H11-337863 A   12/1999
JP   2002-116406 A   4/2002
JP   2008-70604 A    3/2008

*Primary Examiner* — Chanh D Nguyen
*Assistant Examiner* — Nguyen H Truong
(74) *Attorney, Agent, or Firm* — Oliff PLC

(57) ABSTRACT

A head-mounted display includes a display device, a projection optical member, and a prism member. The prism member includes a first prism receiving image light from the projection optical member, and a second prism disposed at a position further toward an exit pupil than the first prism. The first prism includes an entrance surface, a first reflection surface, and a first joining surface, the second prism includes a second joining surface joined to the first joining surface via a semi-transmissive reflection surface, a second reflection surface, and a light collecting reflection surface, and the semi-transmissive reflection surface is configured to reflect the image light, reflected by the light collecting reflection surface and then totally reflected by the second reflection surface, to pass through the second reflection surface.

7 Claims, 4 Drawing Sheets

(56) References Cited

U.S. PATENT DOCUMENTS

| | | | |
|---|---|---|---|
| 2004/0119664 A1* | 6/2004 | Inoguchi | G02B 27/0172 345/8 |
| 2008/0180596 A1 | 7/2008 | Fujimoto | |
| 2012/0200937 A1* | 8/2012 | Totani | H04N 13/344 359/631 |
| 2015/0062697 A1* | 3/2015 | Komatsu | G02B 27/017 359/365 |
| 2015/0160460 A1* | 6/2015 | Komatsu | G02B 17/0856 359/629 |

* cited by examiner

HEAD-MOUNTED DISPLAY

The present application is based on, and claims priority from JP Application Serial Number 2018-130462, filed Jul. 10, 2018, the disclosure of which is hereby incorporated by reference herein in its entirety.

BACKGROUND

1. Technical Field

The present disclosure relates to a head-mounted display allowing a person mounting the head-mounted display on the head to view a virtual image.

2. Related Art

JP-A-11-337863 discloses an image display device including a prism-shaped member having an entrance surface on which light from an image display element is incident, and two curved reflection surfaces that are eccentric to each other and configured to reflect light incident from the entrance surface, and, in the image display device, light reflected by both of the curved reflection surfaces is emitted from one of the curved reflection surfaces. In a modified example of the image display device, a pair of prisms is combined and a half mirror is disposed at the boundary between the pair of prisms, in order to split an optical path or combine optical paths (see FIG. 4 and the like).

However, in the image display device of JP-A-11-337863, the basic elements are the eccentric optical surfaces, and thus, it is not easy to form an image with reduced aberrations.

SUMMARY

A head-mounted display according to an aspect of the present disclosure includes a display element, a projection optical member configured to receive image light emitted from the display element and project the image light, and a prism member configured to receive the image light emitted from the projection optical member and emit the image light toward a position of an exit pupil. In the head-mounted display, the prism member includes a first prism configured to receive the image light from the projection optical member and a second prism disposed at a position further toward an exit pupil than the first prism, the first prism includes an entrance surface configured to receive the image light, a first reflection surface configured to totally reflect the image light entering from the entrance surface, and a first joining surface joined to the second prism, the second prism includes a second joining surface joined to the first joining surface via a semi-transmissive reflection surface, a second reflection surface configured to totally reflect the image light entering from the first prism through the second joining surface, and a light collecting reflection surface configured to reflect, toward the second reflection surface, the image light totally reflected by the second reflection surface, and the semi-transmissive reflection surface is configured to reflect the image light, which is reflected by the light collecting reflection surface and then totally reflected by the second reflection surface, to pass through the second reflection surface.

DESCRIPTION OF EXEMPLARY EMBODIMENTS

First Embodiment

Below, a head-mounted display of a first embodiment according to the present disclosure will be described with reference to the drawings.

Figure 1A:
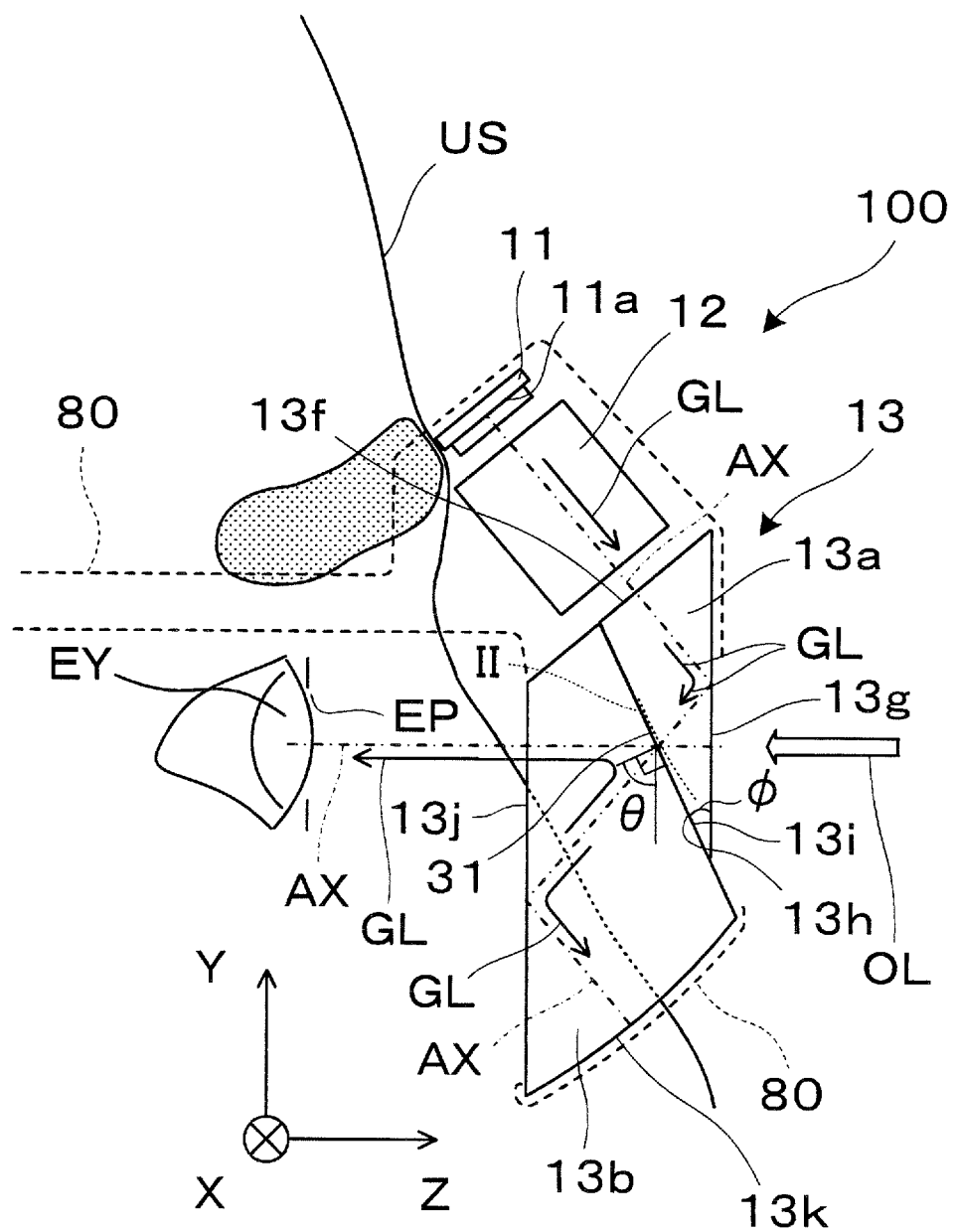
FIG. 1A is a side cross-sectional view illustrating a head-mounted display according to a first embodiment.
Figure 1B:
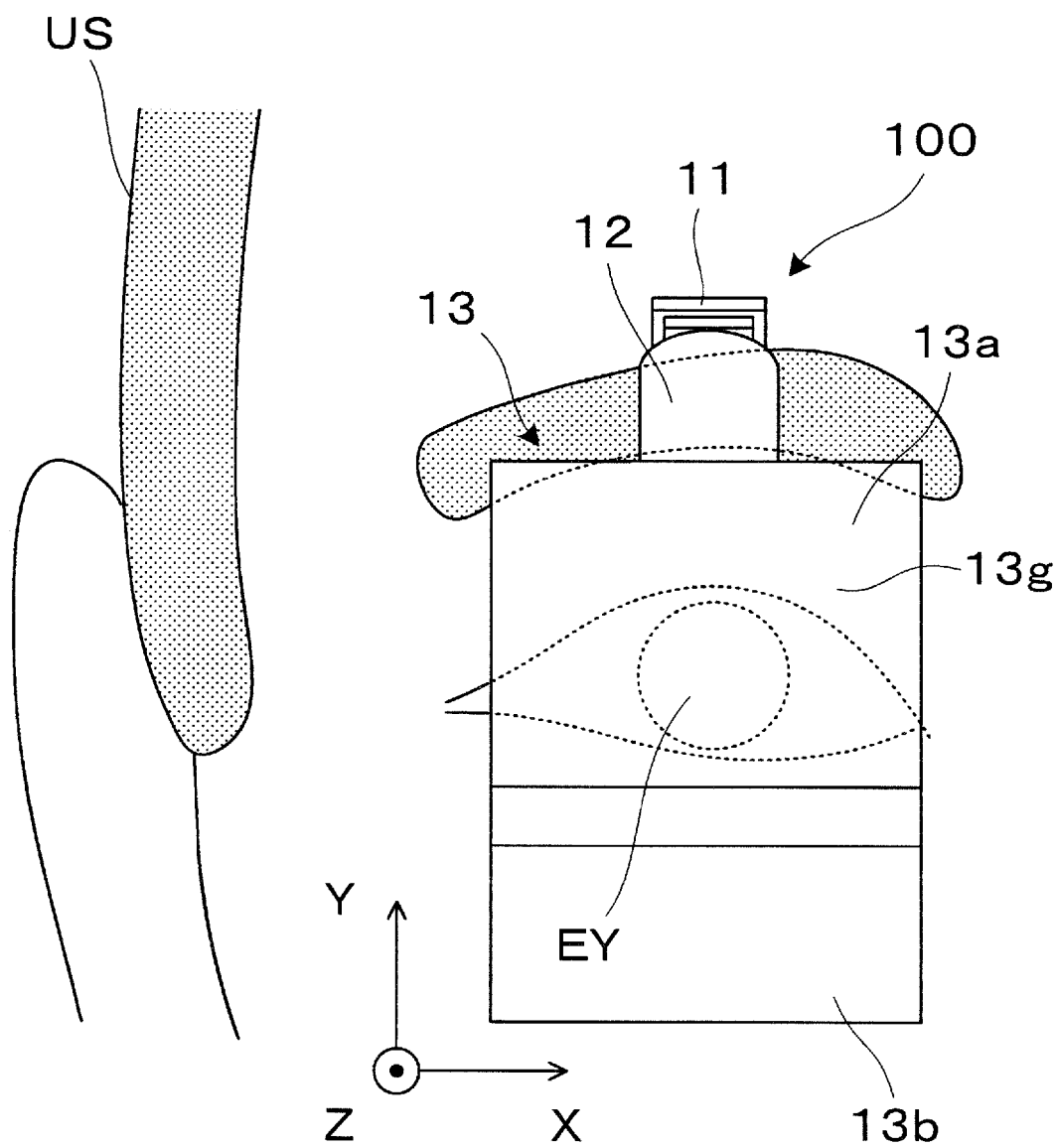
FIG. 1B is a front view illustrating a head-mounted display according to the first embodiment.

In FIGS. 1A and 1B, X, Y, and Z form an orthogonal coordinate system, the X direction corresponds to a lateral direction in which both eyes of an observer US mounting a head-mounted display 100 are aligned, the Y direction corresponds to an upward direction orthogonal to the lateral direction for the observer US in which both eyes of the observer US are aligned, and the Z direction corresponds to a forward direction or a front direction for the observer US. Note that the Y direction corresponds to a direction in which a prism member 13 described below extends, the Z direction corresponds to a thickness direction of the prism member 13, and the X direction is a direction orthogonal to the Y direction and the Z direction.

The illustrated head-mounted display 100 allows the observer US to recognize a video as a virtual image. The head-mounted display 100 includes a display device 11, a projection optical member 12, and the prism member 13. The display device 11 and the projection optical member 12 are housed in the case of a frame 80, and the prism member 13 is supported by the frame 80 in an exposed state. Note that in the drawings, only the head-mounted display 100 for the right eye is illustrated, but a virtual image display device for the left eye having a similar structure or a similar structure inverted right and left can be combined, and in this case, the head-mounted display 100 with an overall appearance similar to that of eyeglasses or swimming goggles, for example, can be provided. One of virtual image display devices for the right eye and for the left eye may be omitted, and in this case, a monocular head-mounted display is provided.

The display device 11 is a self-emissive display element represented by, for example, an organic-electroluminescence, an LED array, an organic LED, a quantum dot inorganic electroluminescent device, and the like, and configured to form a color still picture or color video on a two-dimensional display surface 11a. The display device 11 is driven by a drive control circuit (not illustrated) to perform display operations. The display device 11 is not limited to a self-emissive display element, and thus, the display device 11 may be a device including an LCD or another light modulating element and configured to form an image by illuminating the light modulating element with a light source.

The projection optical member 12 is a projection lens configured to receive and project image light GL emitted from the display surface 11a of the display device 11. The projection optical member 12 includes a plurality of spherical or aspherical element lenses (not illustrated) arranged along an optical axis AX parallel to the YZ plane and extending in an oblique direction inclined with respect to the up and down direction. The projection optical member 12 forms, in the prism member 13 in a subsequent stage, an intermediate image II formed by appropriately enlarging an image formed on the display surface 11a of the display device 11. By forming the intermediate image II in the prism member 13, it becomes easy to reduce the size of the optical system including the prism member 13 and the like. In addition, by forming the intermediate image II so as not to reach the entrance surface 13f described below, dust on the surface of the entrance surface 13f can be prevented from affecting image formation to prevent image unevenness from being formed. Furthermore, by forming the intermediate image II at a position away from the first joining surface 13h so as not to reach the first joining surface 13h or the semi-transmissive reflection surface 31 described below, it is also possible to prevent dust or air bubbles from affecting image formation to suppress image unevenness from being formed. The image plane of the intermediate image II is curved as described in detail below. The projection optical member 12 is not limited to a projection optical member including a lens element only, and may include a folding mirror configured to fold an optical path, a filter having various functions, and the like.

The prism member 13 is disposed directly below the projection optical member 12. The prism member 13 is configured to receive the image light GL emitted from the projection optical member 12, and emit the image light GL to the position of the exit pupil EP. The prism member 13 includes a first prism 13a on which the image light GL from the projection optical member 12 is incident, and a second prism 13b disposed, as a whole, at a position closer to an exit pupil EP or a pupil EY, as compared to the first prism 13a. Both of the first and second prisms 13a and 13b are triangular prisms extending in the X-axis direction.

The first prism 13a includes an entrance surface 13f on which the image light GL is incident, a first reflection surface 13g configured to totally reflect the image light GL incident from the entrance surface 13f, and a first joining surface 13h to be joined to the second prism 13b with the semi-transmissive reflection surface 31 interposed therebetween. Here, the entrance surface 13f extends in a direction orthogonal to the optical axis AX. The entrance surface 13f is planar in the illustrated example, but may have optical power. The entrance surface 13f is inclined in a direction midway between the +Y direction and the −Z direction. On the other hand, the first reflection surface 13g is a non-inclined planar surface extending along the vertical XY plane. For the image light GL entering along the optical path and at a relatively large incident angle, the first reflection surface 13g functions as a mirror having a high reflectivity, i.e., a total reflection surface, by using total internal reflection of the first reflection surface 13g. The first joining surface 13h is a plane inclined with respect to the optical axis AX, and also inclined with respect to the Y direction and the Z direction. The semi-transmissive reflection surface 31 is formed along the surface of the first joining surface 13h.

The second prism 13b has a second joining surface 13i to be joined with the first joining surface 13h of the first prism 13a with the semi-transmissive reflection surface 31 interposed therebetween, a second reflection surface 13j disposed opposite to and in parallel to the first reflection surface 13g of the first prism 13a, and a light collecting reflection surface 13k adjacent to the second reflection surface 13j and disposed below the second reflection surface 13j. As in the first joining surface 13h, the second joining surface 13i is planar. The second reflection surface 13j is configured to totally reflect the image light GL from the second joining surface 13i toward the light collecting reflection surface 13k, and totally reflect the image light GL from the light collecting reflection surface 13k toward the second joining surface 13i. For the image light GL initially entering from the first prism 13a along the optical path at a relatively large incident angle, and the image light GL entering back from the light collecting reflection surface 13k at a relatively large incident angle, the second reflection surface 13j functions as a mirror having a high reflectivity, i.e., a total reflection surface by using total internal reflection. However, in the further forward section of the optical path, for the image light GL entering from the second joining surface 13i side or the semi-transmissive reflection surface 31 side at a relatively small incident angle, the second reflection surface 13j functions as a transmissive surface or a refractive surface to transmit the image light GL. That is, the second reflection surface 13j passes the image light GL traveling in the −Z direction as a whole after reflected sequentially by the light collecting reflection surface 13k, the second reflection surface 13j, and the semi-transmissive reflection surface 31. Since the first reflection surface 13g and the second reflection surface 13j are parallel, the prism member 13 has a portion that functions as parallel flat plates, when the semi-transmissive reflection surface 31 is not taken into consideration.

The semi-transmissive reflection surface 31 sandwiched between the first and second joining surfaces 13h and 13i partially passes the image light GL entering the second prism 13b from the first prism 13a. Further, after passing through the semi-transmissive reflection surface 31, totally reflected by the second reflection surface 13j, traveling back via the light collecting reflection surface 13k described below, and again, totally reflected by the second reflection surface 13j to be returned to the semi-transmissive reflection surface 31, the image light GL is partially reflected by the semi-transmissive reflection surface 31 and is emitted through the second reflection surface 13j toward the position of the exit pupil EP.

As described above, the semi-transmissive reflection surface 31 has a role of emitting, in the −Z direction being the normal direction of the second reflection surface 13j, the image light GL returned from the light collecting reflection surface 13k. The semi-transmissive reflection surface 31 and the Y axis corresponding to the up and down direction or the vertical direction form an angle θ that is greater than or equal to 45°, and more preferably greater than 45°. In other words, the normal line of the semi-transmissive reflection surface 31 and the Y axis form the angle θ that is greater than or equal to 45° and more preferably greater than 45°, and specifically form an angle of approximately 60°. On the other hand, the semi-transmissive reflection surface 31 and the first reflection surface 13g of the first prism 13a form an angle φ of less than or equal to 45°, and more preferably less than 45°. Correspondingly, after passing through the semi-transmissive reflection surface 31, the image light GL is caused to be incident on the light collecting reflection surface 13k via the second reflection surface 13j functioning as a total reflection surface, rather than directly entering the light collecting reflection surface 13k. Similarly, after reflected by the light collecting reflection surface 13k, the image light GL is caused to be incident on the semi-transmissive reflection surface 31 via the second reflection surface 13j functioning as a total reflection surface, rather than directly entering the semi-transmissive reflection surface 31. As such, by interposing the reflection surfaces 13g and 13j and inclining the semi-transmissive reflection surface 31 by more than 45° with respect to the vertical direction, that is, inclining the semi-transmissive reflection surface 31 by less than 45° with respect to the first reflection surface 13g, it is possible to reduce the thickness of the prism member 13 in the Z-direction, in spite of the image light GL being directed in a direction intersecting the optical axis AX extending toward the exit pupil EP side or in the Z direction on the front of the pupil EY and collimated by the non-eccentric type light collecting reflection surface 13k.

The first reflection surface 13g of the first prism 13a and the second reflection surface 13j of the second prism 13b are parallel to each other, and the semi-transmissive reflection surface 31 is semi-transmissive. As a result, external light OL will pass through the parallel flat plate-shaped prism member 13, allowing for see-through view of the external environment. In terms of ensuring the sufficient luminance of the image light GL and facilitating the see-through observation of external light, the reflectivity of the semi-transmissive reflection surface 31 with respect to the image light GL and the external light OL is from approximately 10% to 50% in an assumed incident angle range of the image light GL. In particular, when the transmittance of the semi-transmissive reflection surface 31 is approximately 50%, the reflectivity of the semi-transmissive reflection surface 31 and the transmittance of the semi-transmissive reflection surface 31 can be substantially equal. In this case, the light utilization efficiency can be maximized.

The light collecting reflection surface 13k is an internal reflection type mirror. The light collecting reflection surface 13k is a non-eccentric type reflection surface, and is spherical as a whole. Specifically, the light collecting reflection surface 13k can be a spherical surface having optical power, an aspherical surface, or the like, and the axis of symmetry of the light collecting reflection surface 13k extends along the direction of the light axis AX and is inclined in a direction midway between the +Y direction and the −Z direction. The light collecting reflection surface 13k is not limited to a spherical surface or the like, and may be a free-form surface or other non-axially-symmetric surfaces.

As described above, the light collecting reflection surface 13k has a spherical surface or a shape similar to a spherical surface. The radius of curvature of the light collecting reflection surface 13k (which may be an approximate radius of curvature) $R_m$ is $2 \times D_i$ being twice the physical distance $D_i$ from the light collecting reflection surface 13k to the intermediate image II. For the radius of curvature $R_m$ in terms of the air conversion value $R_m/n$, the following relationship holds: $R_m/n = D_a \times 2$, where the air conversion length from the light collecting reflection surface 13k to the intermediate image II $D_a = D_i/n$. In the above equation, n is a refractive index of the second prism 13b, and the like. Therefore, the image light GL from intermediate image II can be collimated and the image light GL corresponding to a virtual image at a distant position can enter the exit pupil EP side or the pupil EY. Here, it is desirable that the exit pupil EP to be disposed at a position corresponding to a diaphragm with respect to the light collecting reflection surface 13k is disposed at a position separated from the light collecting reflection surface 13k by an optical distance of approximately $R_m/n$ being the air conversion value of the radius of curvature, in terms of a substantive principal ray. In other words, it is desirable that the air conversion length L from the exit pupil EP to the light collecting reflection surface 13k satisfies $L \cong R_m/n$ in terms of suppressing aberrations to improve performance. This allows comatic aberration, astigmatism, and the like to be reduced to almost zero because the image light GL emitted substantially perpendicularly from the light collecting reflection surface 13k enters the exit pupil EP. Here, in the air conversion length L, the deviation from the above-described air conversion value $R_m/n$ should be specifically within 15%. When the light collecting reflection surface 13k is a spherical surface, the radius of curvature $R_m$ of the light collecting reflection surface 13k is the radius of curvature of the spherical surface. When the light collecting reflection surface 13k is an aspherical or free-form surface, the radius of curvature $R_m$ of the light collecting reflection surface 13k is an approximate radius of curvature obtained by fitting a spherical surface to the aspherical or free-form surface. Furthermore, when the intermediate image II projecting toward the light collecting reflection surface 13k side is formed in the prism member 13, the intermediate image II has a shape similar to the spherical surface as a whole, and the approximate radius of curvature of the intermediate image II is approximately $(1/2) \times R_m$ being half of the radius of curvature $R_m$ of the light collecting reflection surface 13k, it is possible to further suppress aberrations.

According to the head-mounted display 100 described above, in which the first prism 13a has the first reflection surface 13g configured to totally reflect the image light GL from the entrance surface 13f, the second prism 13b has the second reflection surface 13j configured to totally reflect the image light GL entering from the first prism 13a, and the light collecting reflection surface 13k configured to reflect the image light totally reflected by the second reflection surface 13j, toward the second reflection surface 13j, and the image light GL having passed through the semi-transmissive reflection surface 31 between the first and second prisms 13a and 13b is returned to the semi-transmissive reflection surface 31 by the light collecting reflection surface 13k, and then, the image light GL returned to the semi-transmissive reflection surface 31 is reflected by the semi-transmissive reflection surface 31 to be transmitted through the second reflection surface 13j, and thus, it is possible to increase the angle of inclination of the semi-transmissive reflection surface 31 and reduce the thickness of the prism member 13. As a result, the optical system can be downsized while providing the angle of view of the display in the head-mounted display 100 that is equivalent to or wider than those in conventional head-mounted displays. Note that the optical distance or the length of the optical path from the light collecting reflection surface 13k to the exit pupil EP, that is the position of the light collecting reflection surface 13k with respect to the exit pupil EP in terms of air conversion length, varies depending on the angle of view of the head-mounted display 100. Here, the optical distance from the light collecting reflection surface 13k to the exit pupil EP is obtained by adding the eye relief (that is, the distance from the exit pupil EP to the prism member 13), the thickness of the prism member 13, and the like, while considering their refractive indices. The angle of view of the head-mounted display 100 is set, for example, to 45°. For example, the thickness of the prism member 13 is adjusted in order to achieve an optical distance from the light collecting reflection surface 13k to the exit pupil EP corresponding to such an angle of view.

Figure 2:
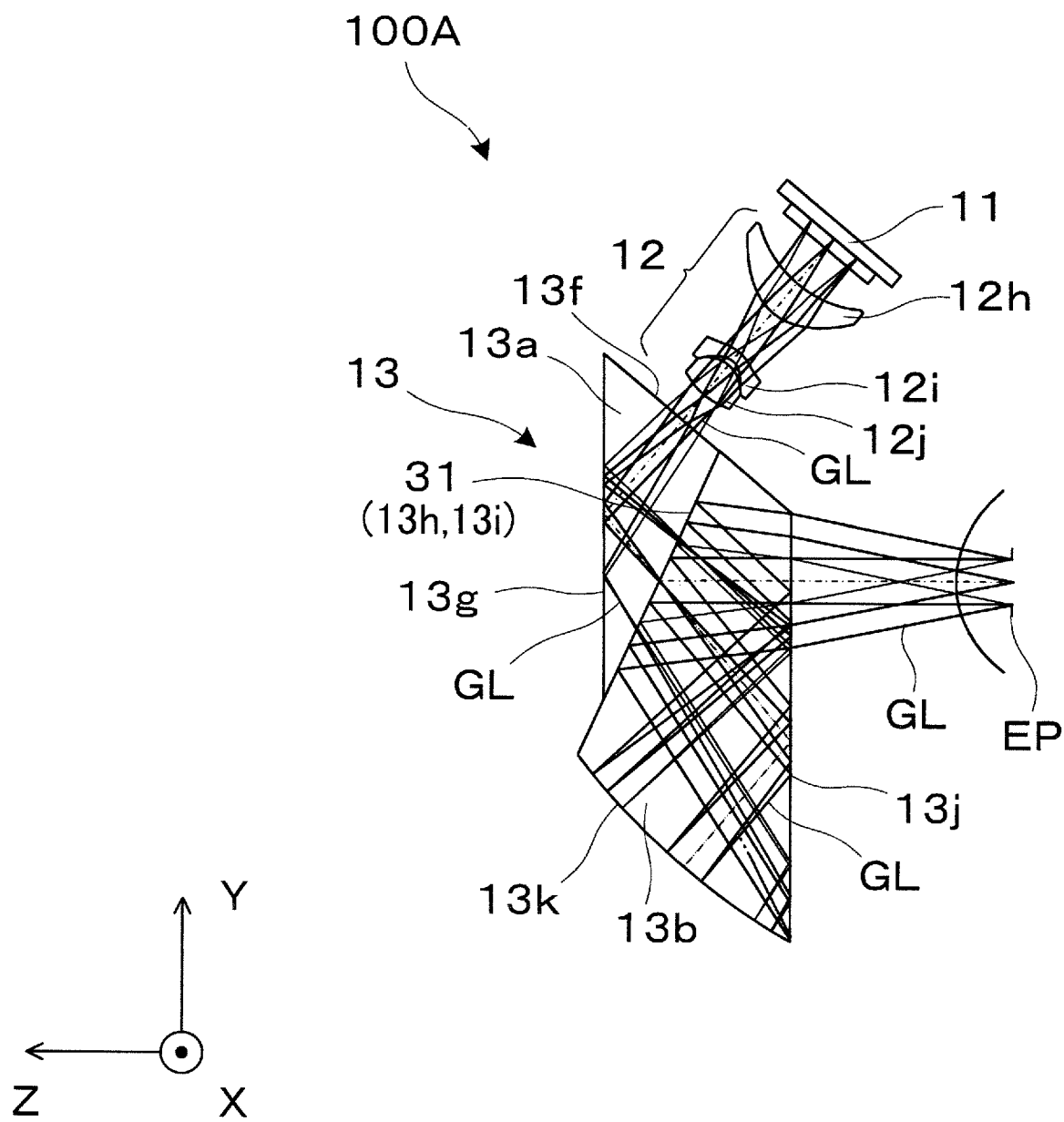
FIG. 2 is a side cross-sectional view illustrating a head-mounted display of Example 1.

FIG. 2 is a cross-sectional view illustrating an optical configuration of a head-mounted display 100A of specific Example 1. The head-mounted display 100A has the same basic structure as the head-mounted display 100 illustrated in FIGS. 1A and 1B, and includes the display device 11, the projection optical member 12, and the prism member 13. In the case of the head-mounted display 100A of FIG. 2, the projection optical member 12 includes first to third lenses 12h, 12i, and 12j. The first to third lenses 12h, 12i, and 12j include spherical surfaces or aspherical surfaces.

Second Embodiment

Below, a head-mounted display according to a second embodiment of the present disclosure will be described.

Note that the head-mounted display of the second embodiment is a partially modified version of the head-mounted display of the first embodiment, and thus, description of common portions will be omitted.

Figure 3:
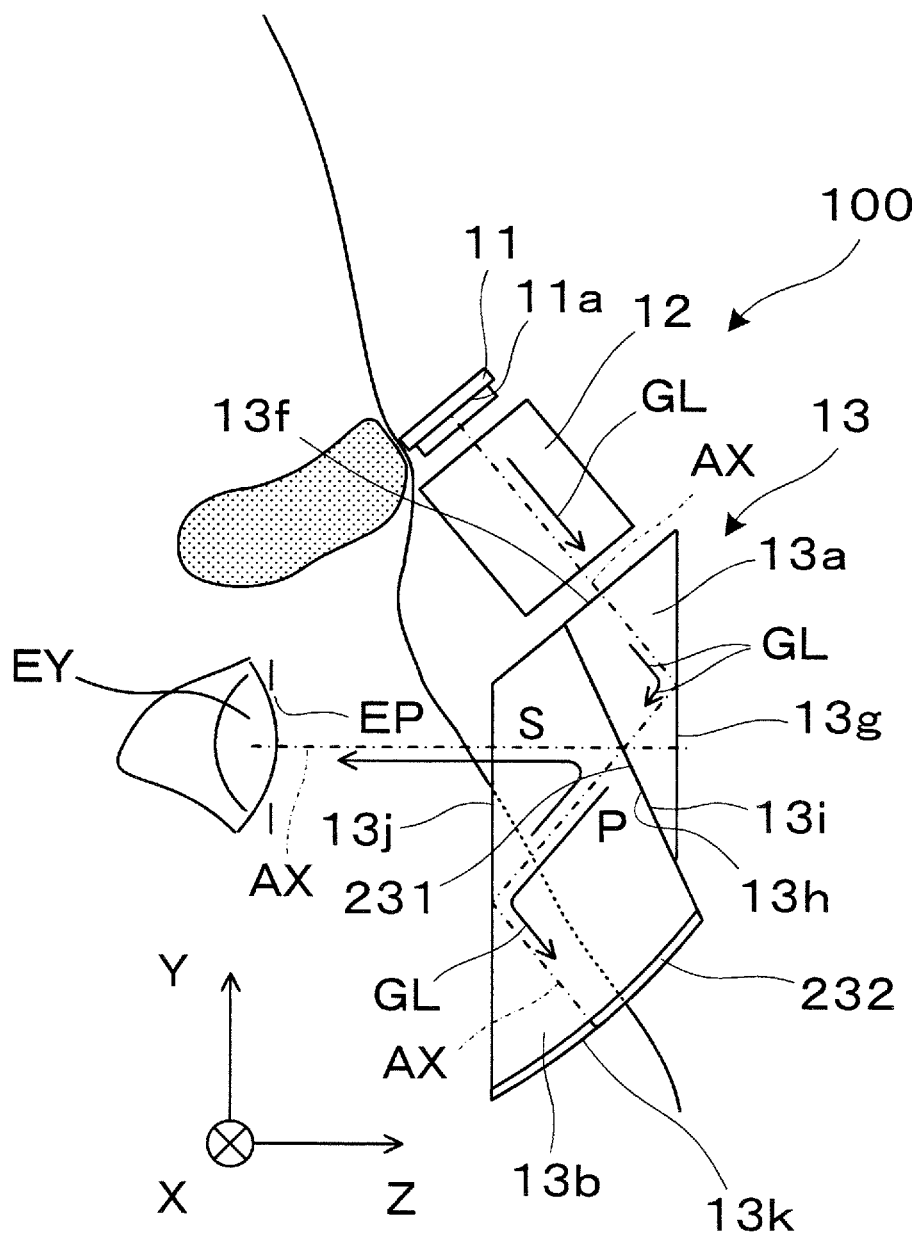
FIG. 3 is a view illustrating a head-mounted display according to a second embodiment.

As illustrated in FIG. 3, the head-mounted display 100 of the second embodiment includes the display device 11, the projection optical member 12, and the prism member 13. In the prism member 13, a semi-transmissive reflection surface 231 is a polarized light separation film, and configured to, for example, transmit P-polarized light and reflect S-polarized light. A wavelength plate 232 is disposed on the inner side of the light collecting reflection surface 13k. The wavelength plate 232 is specifically a quarter wavelength plate. In this case, the image light GL emitted from the display device 11 is, for example, P-polarized light only. The display device 11 itself may generate polarized light, or polarized light in a certain direction selected from the image light generated by the display device 11 may be used. The image light GL from the display device 11 enters the prism member 13, is reflected by the first reflection surface 13g to form the intermediate image II, and then passes through the semi-transmissive reflection surface 231 almost without loss. After passing through the semi-transmissive reflection surface 231, the P-polarized image light GL is reflected by the second reflection surface 13j, passes through the wavelength plate 232, is reflected by the light collecting reflection surface 13k to travel back, and again, enters the semi-transmissive reflection surface 231 via the second reflection surface 13j. The image light GL re-entering the semi-transmissive reflection surface 231 is S-polarized light, because the polarization direction of the image light GL has been rotated by 90° by the wavelength plate 232. Thus, the image light GL is reflected by the semi-transmissive reflection surface 231 almost without loss, and bright image light GL enters the exit pupil EP.

MODIFIED EXAMPLES AND OTHERS

The present disclosure is explained according to the embodiments as described above, but the present disclosure is not limited to the above-mentioned embodiments. The present disclosure may be carried out in various modes without departing from the gist of the present disclosure, and, for example, the following modifications may be carried out.

In the head-mounted display 100 of the above-described embodiment, a self-emissive display element such as an organic-electroluminescence element is used as the display device 11, but alternatively, a display element using a laser scanner in which a laser light source and a scanner, such as a polygon mirror, are combined may be incorporated.

The first reflection surface 13g of the first prism 13a may be a mirror coated with a metal or the like. In this case, a head-mounted display without observation capability of external light OL or the image of the external environment is provided.

The first reflection surface 13g of the first prism 13a and the second reflection surface 13j of the second prism 13b may include a hard coat layer or an antireflection coating formed thereon.

In the second embodiment, the position of the wavelength plate 232 is not limited to the illustrated position, and thus the wavelength plate 232 can be disposed between the semi-transmissive reflection surface 231 and the light collecting reflection surface 13k. For example, the wavelength plate 232 may be included at a position adjacent to the semi-transmissive reflection surface 231 and on the light collecting reflection surface 13k side.

The orientation of the optical system for one eye, that includes a set of elements including the display device 11, projection optical member 12, and prism member 13, may be rotated by 90°, for example, around the optical axis parallel to the Z-axis, as compared to the orientation of the illustrated optical system.

In the above, the head-mounted display 100 is assumed to be worn on a head during use, but the above-described head-mounted display 100 can also be used as a handheld display configured to be looked into in a similar manner to binoculars instead of being mounted on a head.

What is claimed is:

1. A head-mounted display comprising:
   a display element;
   a projection optical member configured to receive image light emitted from the display element and project the image light; and
   a prism member configured to receive the image light emitted from the projection optical member and emit the image light toward a position of an exit pupil, wherein
   the prism member includes a first prism configured to receive the image light from the projection optical member and a second prism,
   the first prism includes an entrance surface configured to receive the image light, a first reflection surface configured to totally reflect the image light entering from the entrance surface, and a first joining surface joined to the second prism,
   the second prism includes a second joining surface joined to the first joining surface via a semi-transmissive reflection surface, a second reflection surface configured to totally reflect the image light entering from the first prism through the second joining surface, and a light collecting reflection surface configured to reflect, toward the second reflection surface, the image light totally reflected by the second reflection surface,
   the semi-transmissive reflection surface is configured to reflect the image light, which is reflected by the light collecting reflection surface and then totally reflected by the second reflection surface, to pass through the second reflection surface,
   the projection optical member is configured to form an intermediate image in the prism member, and
   a radius of curvature of the light collecting reflection surface is substantially twice an optical distance from the light collecting reflection surface to the intermediate image.

2. The head-mounted display according to claim 1, wherein the second reflection surface is disposed opposite and parallel to the first reflection surface.

3. The head-mounted display according to claim 1, wherein the intermediate image is formed at a position away from the first joining surface.

4. The head-mounted display according to claim 1, wherein an optical distance from the light collecting reflection surface to the exit pupil is substantially equal to the radius of curvature of the light collecting reflection surface.

5. The head-mounted display according to claim 1, wherein a reflectivity of the semi-transmissive reflection surface and a transmittance of the semi-transmissive reflection surface are substantially equal.

6. The head-mounted display according to claim 1, wherein an angle formed between the first reflection surface of the first prism and the semi-transmissive reflection surface between the first and second prisms is less than 45°.

7. The head-mounted display according to claim 1, wherein the semi-transmissive reflection surface is formed of a polarized light separation film, and a wavelength plate is disposed between the semi-transmissive reflection surface and the light collecting reflection surface.

\* \* \* \* \*